United States Statutory Invention Registration [19]

[11] Reg. Number: H403

Glasser [43] Published: Jan. 5, 1988

[54] GUN LAUNCHED KINETIC ENERGY PENETRATOR

[75] Inventor: Alan Glasser, Bala Cynwyd, Pa.

[73] Assignee: The United States of America as represented by the Secretary of the Army, Washington, D.C.

[21] Appl. No.: 52,507

[22] Filed: May 7, 1987

[51] Int. Cl.[4] ..... F42B 15/00

[52] U.S. Cl. ..... 102/374; 102/376; 102/430; 102/520

*Primary Examiner*—Harold J. Tudor

*Attorney, Agent, or Firm*—Anthony T. Lane; Harold H. Card, Jr.; Edward F. Costigan

[57] ABSTRACT

A kinetic energy penetrator assembly includes a motor casing having an aft opening. A nozzle with a nozzle opening is seated in the aft opening of the casing and confines expanding gases produced by burning propellant in the casing to a configuration for applying a thrust to the casing. An aft pusher plate is connected to a plug which plugs the nozzle opening and which has an aft space for receiving expanding gases. A penetrator rod is connected to the forward end of the motor casing and includes a bore riding sabot having substantially the same diameter as the diameter of the pusher plate and an aft portion of the motor casing. The penetrator assembly is meant to be launched from a gun with expanding gases in the gun barrel pushing against the pusher plate and ejecting the penetrator at some velocity from the barrel bore. An initiator carried in the pusher plate and nozzle plug begins to burn when it is exposed to the expanding gases in the gun barrel and, after a selected period of time, ignites propellant in the motor casing which first boosts the velocity of the penetrator assembly and thereafter sustains its velocity. The sabot is designed to peel away from the rod after the penetrator leaves the barrel for producing an aerodynamically advantageous configuration for the penetrator assembly.

12 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

GUN LAUNCHED KINETIC ENERGY PENETRATOR

STATEMENT OF GOVERNMENT INTEREST

The invention described herein may be manufactured, used and licensed by or for the Government for Governmental purposes without the payment to me of any royalties thereon.

FIELD AND BACKGROUND OF THE INVENTION

The present invention relates in general to ordinance and in particular to a new and useful rocket powered kinetic energy projectile which is designed to be launched from a gun.

It is known to fire projectiles from a gun which, in and of themselves, are either explosive or meant solely for penetration. The projectile attains all of its velocity by expanding gases in the barrel.

Projectiles are also known which include a small rocket motor. The motors are ignited while the projectile is in the barrel of a gun-like structure. The rocket motors provide all of the thrust for accelerating the projectile to its maximum velocity. This type of projectile has had only limited success. It has been found not to have the accuracy or be capable of obtaining the speeds of conventional passive projectiles.

SUMMARY OF THE INVENTION

The present invention is drawn to a kinetic energy penetrator rod which includes a rocket motor and which can be launched by a gun. The rocket motor is ignited only after the projectile leaves the gun barrel.

A conventional gun with rifling can be used. Only moderate spin is necessary for the inventive projectile however so that a slip-ring is provided between the projectile and the rifling to transfer only a limited amount of spin to the projectile. This modest spin rate is used primarily to average out any thrust misalignments or manufacturing tolerances on the outer surface of the projectile. The projectile is aerodynamically designed for low drag and for aerodynamic stability in flight.

Accordingly an object of the present invention is to provide a kinetic energy spike or penetrator assembly which is adapted to be launched from a gun, and which comprises a motor casing having an aft opening, an ignitable propellant in the casing for generating expanding gases, a nozzle connected to the casing and closing the aft opening thereof, the nozzle having a nozzle opening for directing expanding gases of the propellant out of the cases to produce a forward thrust on the casing, and a push plate engaged over the aft end of the nozzle and casing for receiving expanding gases from a charge in the gun and for transferring kinetic energy of those expanding gases to the casing. A penetrator rod is connected to the forward end of the casing and has a forward gun barrel bore rider sabot thereon. The outer diameter of the pusher plate and of the sabot are about equal to the inner diameter of the gun barrel for establishing a proper alignment between the barrel axis and the penetrator assembly axis. A slip spin ring is provided on an outer surface of the pusher plate for transmitting only some of the spin from rifling of the gun to the penetrator assembly so that the penetrator assembly spins only a moderate amount when it leaves the gun barrel. An initiator is connected through the pusher plate and holds a nozzle plug which is seated in the nozzle opening. The initiator has a delay charge which is ignited by the expanding gases of the gun and which, after a certain period of time, provide an igniting flame through the initiator to the propellant in the casing for igniting the propellant.

A further object of the invention is to provide such a penetrator assembly or spike wherein the propellant has an aft booster part and a forward sustain part for initially accelerating the spike and thereafter sustaining a thrust on the spike for the remainder of its flight.

A still further object of the invention is to provide a spike or penetrator assembly which is simple in design rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
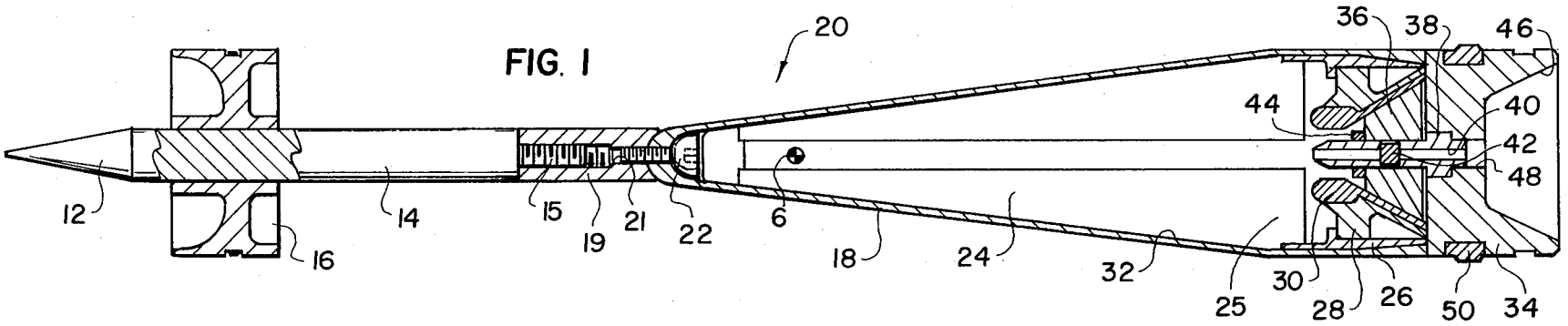
FIG. 1 is a side sectional view, partially in elevation, of a spike or penetrator assembly according to the present invention.

Referring to the drawings in particular, the invention embodied in FIG. 1 comprises a spike or penetrator assembly generally designated 20.

The spike 20 includes a forward nose faring 12 which is connected to the forward end of a penetrator rod 14. Around the forward end of the penetrator rod a bore rider sabot 16 is engaged. Sabot 16 rides the bore of a barrel shown at 60 in FIG. 2. Sabot 16 is made of soft metal or synthetic material which breaks up after it leaves the barrel bore. The sabot includes a dished forward space which catches air to facilitate this break-up effect.

Rod 14 is connected to a rocket motor casing 18 by a connecter 19 having a threaded bore 21 therethrough. Threaded bore 21 has two threaded portions. The forward threaded portion threadably receives a threaded aft end 15 of rod 14. The rear threaded portion of connecter 19 threadably receives a forward threaded portion of a connecter nut 22. The head of connecter nut 22 has a rounded configuration for engaging against the rounded forward end of casing 18. The connecter 19 has a rounded aft end for engaging the rounded forward end of casing 18.

A plurality of internal propellant supporting fins 24 are provided in casing 18. The fins extend radially and in known fashion. The propellant on fins 24 include an aft booster portion 25 which generates more expanding gas for providing a boost to accelerate the projectile. The remainder of the propellant on fins 24 act as a sustain propellant which sustains the velocity of the spike throughout the remainder of its flight.

The open end of casing 18 is provided with an aft case closure 26. A nozzle 28 is seated in the closure 26 and defines a nozzle opening. The nozzle opening is lined by a known nozzle liner 30 which protects metal parts of the nozzle from heat damage. The casing 18 also has an insulated lining 32 which protects it from heat generated by the burning propellant.

A nozzle plug 36 made of metal or synthetic material is frictionally engaged in the nozzle opening and acts to plug the nozzle opening.

A generally cylindrical initiator 38 extends through a central opening of nozzle plug 36 and is held by a nut 44. The initiator 38 has a central bore 40 which is blocked by a delay charge 42 which can be ignited at its aft end by gases and which burns at a known rate to produce a delay effect. After a known delay the burning delay charge 42 will ignite the booster portion 25 of the propellant on support fins 24. Immediately after the booster portion has been burned the sustain portion of the propellant begins burning. The initiator 38 thus acts as delay ignition means for igniting the propellant charge only after the spike 20 has left its launching barrel 60.

The spike includes an aft pusher plate 34 having a dished aft opening 46 which is designed to accept the pressure of expanding gases in a gun barrel and transmit the force to the casing 18. For this purpose pusher plate 34 is engaged against the aft end of the nozzle 28 and/or the casing 18.

Initiator 38 is threaded into bore 48 of pusher plate 34 so that the plug 36 is held fast to the pusher 34. Pusher 34 includes an outer annular groove which receives a slip spin-ring 50 which slides with some frictional resistance around the pusher plate 34 as a result of its engaging rifling 62 in the barrel bore 60 (FIG. 2).

Figure 2:
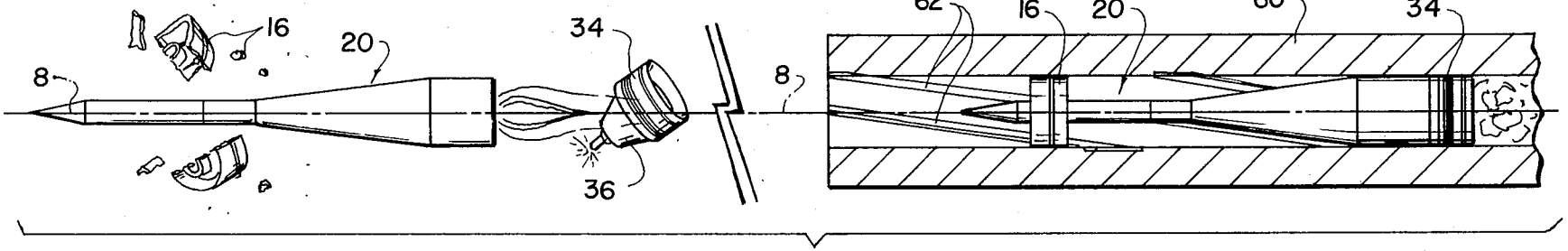
FIG. 2 is a composite side elevational view of the spike as it approaches the end opening of a barrel bore, and as it appears at a selected point in time after it has left the barrel bore.

In operation and as illustrated in FIG. 2, the spike 20 is launched from a recoilless or standard gun having a barrel 60 with a bore which includes rifling 62. Rifling 62 imparts only some of its spin to the spike 20 over slip spin-ring 50. The forward end of spike 20 is held aligned with the flight axis 8 by the sabot 16 which rides in the bore of barrel 60.

Expanding gases in the barrel which can be generated by a charge in the barrel or a charge connected to the spike (not shown) and function to push against pusher plate 34 and thus eject the spike 20 at some velocity from the end of the barrel 60. These expanding gases also ignite delay charge 48.

As shown at the left of FIG. 2 at some selected time after the spike 20 has left barrel 60, wind resistance has broken up and peeled away the sabot 16 and the propellant in the motor casing has ignited. This helps to eject the nozzle plug 64 with its connected pusher plate 42 from the remainder of the penetrator. The boost portion of the charge then burns for a brief period to accelerate the spike 20 to a selected velocity. The sustain charge then ignites and burns through the remainder of the flight to sustain this velocity until a target is reached or until the sustain charge is expended.

The moderate amount of spin which is transmitted to the penetrator 20 while it is in the barrel 60 acts to average out any thrust misalignments or manufacturing tolerances on the outer surface of the spike 20. The outer configuration of the spike has been selected for aerodynamic stability. The parts are also distributed to establish a center of gravity 6 (FIG. 1) which adds to the aerodynamic stability.

In practice, a gun with an appropriate charge is utilized to accelerate the spike 20 to a speed of about two thousand feet per second. The delay charge is selected to burn for about 20 milli-seconds. The booster portion 25 burns for about 200 milli-seconds or less and then the sustain portion is ignited to sustain flight of the spike to its target.

The motor casing 18 as shown in FIG. 1 has a conical forward portion and a cylindrical aft portion which has the same diameter as the cylindrical pusher plate 34. The rod 14 is cylindrical and has the same diameter as the forward end of connecter 19. The rear end of connecter 19 can flare out slightly to start the taper of casing 18.

The aft opening of casing 18 is slightly inwardly tapered to more positively retain the closure element 26 and the nozzle 28 connected thereto.

While a specific embodiment of the invention has been shown and described in detail to illustrate the application of the principles of the invention, it will be understood that the invention may be embodied otherwise without departing from such principles.

What is claimed is:

1. A kinetic energy penetrator assembly adapted to be launched from a gun barrel bore, comprising:

a motor casing defining a space and having an aft opening and a forward end;

an ignitable propellant in said casing space ignitable to generate expanding gases;

a nozzle connected to said casing and closing said aft opening thereof, said nozzle having a nozzle opening for directing expanding gases out of the casing to produce a forward thrust for the casing;

a pusher plate engaged with an aft end of the motor casing and adapted for transmitting the thrust of expanding gases at an aft end of the pusher plate to the motor casing;

a nozzle plug connected to the pusher plate and engaged with the nozzle opening for closing the nozzle opening;

delay ignition means connected to the nozzle plug and pusher plate for igniting upon exposure to expanding gases and burning for a selected period of time after which said delay ignition means ignite said propellant in said motor casing;

a penetrator rod having a smaller outer diameter than a maximum outer diameter of said motor casing and connected to said forward end of said motor casing; and a sabot engaged around said penetrator rod and having an outer diameter substantially equal to an outer diameter of said pusher plate;

whereby the kinetic energy penetrator assembly can be launched from a barrel bore by expanding gases in the barrel bore aft of the pusher plate, and the propellant charge can be ignited after the penetrator assembly leaves the gun barrel.

2. An assembly according to claim 1, wherein said sabot is designed to break away from said rod when the penetrator assembly leaves a barrel bore.

3. An assembly according to claim 1, including a rearwardly outwardly tapering nose faring connected to a forward end of said rod.

4. An assembly according to claim 3, wherein said motor casing has a forward outer diameter substantially equal to an outer diameter of said rod and a rearward cylindrical portion having the maximum casing diameter and substantially equal in diameter to said pusher plate.

5. An assembly according to claim 1, including a slip spin-ring engaged on an outer surface of said pusher plate for transmitting some spin of rifling in a barrel bore for launching the penetrator assembly, to the penetrator assembly.

6. An assembly according to claim 5, including a rearwardly outwardly tapering nose faring connected to a forward end of said rod, said casing having a tapered forward end tapering outwardly and rearwardly from a diameter of said rod to said maximum diameter thereof, said casing including an aft cylindrical portion having said maximum diameter and said pusher plate having said maximum diameter.

7. An assembly according to claim 6, wherein said delay ignition means comprises an initiator extending through a central bore of said pusher plate and a central bore of said nozzle plug, said initiator having a central bore and a delay charge in said central bore of said initiator which is ignitable upon exposure to expanding gases and burns for a known period of time.

8. An assembly according to claim 7, including a connecter connected between said rod and said forward end of said casing, said connecter having a central threaded bore threadably receiving a portion of said rod, and a nut engaged with an interior of said casing and threaded into said threaded bore of said connecter.

9. An assembly according to claim 8, wherein said forward end of said casing is rounded, said connecter having a rear concavely rounded surface for receiving said forward rounded end of said casing.

10. An assembly according to claim 9, including a plurality of radially extending rib supports in said casing space for supporting said propellant.

11. An assembly according to claim 10, wherein said pusher plate has a concavely dished aft surface for receiving expanding gases.

12. An assembly according to claim 11, wherein said casing includes an insulating liner between said casing and said propellant.

* * * * *